US011951061B2

(12) United States Patent
Morris

(10) Patent No.: US 11,951,061 B2
(45) **Date of Patent: *Apr. 9, 2024**

(54) TELESCOPING MASSAGE ROLLER AND ASSEMBLY OF A PHYSICAL FITNESS CAGE WITH A TELESCOPING MASSAGE ROLLER

(71) Applicant: Daniel Morris, Buffalo, NY (US)

(72) Inventor: Daniel Morris, Buffalo, NY (US)

( * ) Notice: Subject to any disclaimer, the term of this patent is extended or adjusted under 35 U.S.C. 154(b) by 693 days.

This patent is subject to a terminal disclaimer.

(21) Appl. No.: 17/014,153

(22) Filed: Sep. 8, 2020

(65) Prior Publication Data

US 2020/0397650 A1 Dec. 24, 2020

Related U.S. Application Data

(63) Continuation of application No. 15/816,709, filed on Nov. 17, 2017, now Pat. No. 10,799,419.

(51) Int. Cl.
*A61H 15/00* (2006.01)

(52) U.S. Cl.
CPC ......... *A61H 15/00* (2013.01); *A61H 15/0092* (2013.01); *A61H 2015/0021* (2013.01);
(Continued)

(58) Field of Classification Search
CPC ................ A61H 15/00; A61H 15/0092; A61H 2015/0021; A61H 2201/0123;
(Continued)

(56) References Cited

U.S. PATENT DOCUMENTS 1,735,538 A 11/1929 Hall
2,229,841 A 1/1941 Eyraud
(Continued)

FOREIGN PATENT DOCUMENTS

CN 103006431 A 4/2013
CN 203915901 U 11/2014
(Continued)

OTHER PUBLICATIONS

Highroller Finland Ltd; HighRoller Shop; 2016; Available at: https://shop.highrollerofficial.com/; Last accessed Jun. 27, 2018.

*Primary Examiner* — Quang D Thanh
(74) *Attorney, Agent, or Firm* — Simpson & Simpson, PLLC

(57) ABSTRACT

A roller device, including a first tube having a first diameter, and a through-bore having a second diameter smaller than the first diameter, the through-bore extending through and concentric with the first tube, a first rod having a third diameter smaller than the second diameter, a first end, and a second end, where the second end of the first rod is operatively arranged to telescopingly engage with the through-bore of the first tube, a second rod having a fourth diameter equal to the third diameter, a first end and a second end, where the first end of the second rod is operatively arranged to telescopingly engage with the through-bore of the first tube, at least one roller arranged to rotate about the first tube, and a first handle fixedly secured to the first end of the first rod.

19 Claims, 15 Drawing Sheets

(52) U.S. Cl.
CPC ................ *A61H 2201/0123* (2013.01); *A61H 2201/0126* (2013.01); *A61H 2201/0153* (2013.01); *A61H 2201/0157* (2013.01); *A61H 2201/0161* (2013.01); *A61H 2201/1253* (2013.01); *A61H 2201/1284* (2013.01); *A61H 2201/1609* (2013.01); *A61H 2201/1614* (2013.01); *A61H 2201/1623* (2013.01); *A61H 2205/062* (2013.01); *A61H 2205/081* (2013.01)

(58) Field of Classification Search
CPC .... A61H 2201/0126; A61H 2201/0153; A61H 2201/0157; A61H 2201/0161; A61H 2201/1253; A61H 2201/1284; A61H 2201/1609; A61H 2201/1614; A61H 2201/1623; A61H 2205/062; A61H 2205/081
See application file for complete search history.

(56) References Cited

U.S. PATENT DOCUMENTS

| | | | | |
|---|---|---|---|---|
| 3,638,939 | A | 2/1972 | Langley | |
| 5,348,529 | A * | 9/1994 | Veltri | A61H 1/00 297/260.1 |
| 5,820,520 | A | 10/1998 | Sieber | |
| 7,104,939 | B1 | 9/2006 | Martinez | |
| 7,534,200 | B1 | 5/2009 | Martinez | |
| 8,449,438 | B2 | 5/2013 | Morin | |
| 9,149,410 | B2 | 10/2015 | Justice Velasco | |
| 9,242,139 | B2 | 1/2016 | Holley | |
| 9,320,675 | B2 | 4/2016 | Johnson | |
| 10,799,419 | B2 * | 10/2020 | Morris | A61H 15/00 |
| 2007/0173749 | A1 | 7/2007 | Williams et al. | |
| 2010/0145243 | A1 * | 6/2010 | Kantor | A61H 39/04 601/118 |
| 2012/0259257 | A1 | 10/2012 | Nelson | |
| 2013/0178768 | A1 | 7/2013 | Dalebout | |
| 2013/0190664 | A1 * | 7/2013 | Johnson | A61H 15/00 601/129 |
| 2014/0128786 | A1 | 5/2014 | Ross | |
| 2015/0202117 | A1 | 7/2015 | Ishibashi | |
| 2016/0016034 | A1 | 1/2016 | Justice Velasco | |
| 2016/0058656 | A1 | 3/2016 | Harvel | |
| 2016/0166465 | A1 | 6/2016 | Marson | |
| 2017/0020771 | A1 | 1/2017 | Shannon | |
| 2017/0156962 | A1 | 6/2017 | Eum | |
| 2017/0231862 | A1 * | 8/2017 | Olschansky | A61H 15/0092 601/128 |
| 2018/0142832 | A1 | 5/2018 | Inouye | |

FOREIGN PATENT DOCUMENTS

| | | | |
|---|---|---|---|
| CN | 204699317 | U | 10/2015 |
| CN | 204745516 | U | 11/2015 |
| KR | 20030016940 | A | 3/2003 |

* cited by examiner

TELESCOPING MASSAGE ROLLER AND ASSEMBLY OF A PHYSICAL FITNESS CAGE WITH A TELESCOPING MASSAGE ROLLER

CROSS REFERENCE TO RELATED APPLICATIONS

This is a continuation of U.S. patent application Ser. No. 15/816,709, filed Nov. 17, 2017, which application is incorporated herein by reference in its entirety.

FIELD

The disclosure relates to a massage roller, more specifically, a massage roller that can be affixed to a stationary support structure, e.g., a power rack or door frame.

BACKGROUND

Exercise, to any significant degree, causes micro-tears in muscle tissue. Additionally, as an individual exercises, muscle tissue burns stored glucose for energy. Lactic acid is a metabolic byproduct of muscle tissue breaking down stored glucose, and often leads to muscle fatigue. Over time, blood flow to the afflicted area both removes lactic acid from the muscle tissue and allows white blood cells, known as prostaglandins, to flood the area to reduce inflammation caused by the micro-tears. Therefore, muscle recovery and removal of lactic acid are directly correlated with blood flow the afflicted muscle tissue. One well know technique for promoting blood flow to muscle tissue, and thus accelerating recovery of the muscle's performance, includes direct application of external physical stress, e.g., massaging the afflicted muscle.

Two-handed massage rollers are well known to athletes and connoisseurs of exercise as a way to massage muscles such as the quadriceps, hamstrings, calves, and glutes. However, one persistent limitation to two-handed massage rollers is the limited range of muscles that can be massaged, i.e., it is difficult to massage a user's triceps when both of the user's arms are holding the massage roller. For example, it is exceedingly difficult, if not impossible, to use a two-handed massage roller to massage a majority of the muscles in a user's back.

Thus, there is a long-felt need for a massage roller that does not require the use of two hands to massage muscle tissue. This creates the possibility of massaging muscles not previously accessible to two-handed massage rollers.

SUMMARY

According to aspects illustrated herein, there is provided a roller device, including a first tube having a first diameter, and a through-bore having a second diameter smaller than the first diameter, the through-bore extending through and concentric with the first tube, a first rod having a third diameter smaller than the second diameter, a first end, and a second end, where the second end of the first rod is operatively arranged to telescopingly engage with the through-bore of the first tube, a second rod having a fourth diameter equal to the third diameter, a first end and a second end, where the first end of the second rod is operatively arranged to telescopingly engage with the through-bore of the first tube, at least one roller arranged to rotate about the first tube, and a first handle fixedly secured to the first end of the first rod.

According to aspects illustrated herein, there is provided a roller device, including a first tube having a first diameter, and a through-bore having a second diameter smaller than the first diameter, the through-bore extending through and concentric with the first tube, a first rod having a third diameter smaller than the second diameter, a first end, and a second end, where the second end of the first rod is operatively arranged to telescopingly engage with the through-bore of the first tube, a second rod having a fourth diameter equal to the third diameter, a first end and a second end, where the first end of the second rod is operatively arranged to telescopingly engage with the through-bore of the first tube, at least one roller arranged to rotate about the first tube, and a first connector fixedly secured to the first end of the first rod.

According to aspects illustrated herein, there is provided a physical fitness cage/roller device assembly including a physical fitness cage having a first vertical support and a second vertical support, and a roller device. The roller device including a first tube having a first diameter, and a through-bore having a second diameter smaller than the first diameter, the through-bore extending through and concentric with the first tube, a first rod having a third diameter smaller than the second diameter, a first end, and a second end, where the second end of the first rod is operatively arranged to telescopingly engage with the through-bore of the first tube, a second rod having a fourth diameter equal to the third diameter, a first end and a second end, where the first end of the second rod is operatively arranged to telescopingly engage with the through-bore of the first tube, and at least one roller arranged to rotate about the first tube.

One object of the roller device of the present disclosure is to provide a one-handed massage roller where one end of the massage roller can be secured to a physical fitness cage or power rack.

Another object of the roller device of the present disclosure is to provide a roller device capable of being supported within a physical fitness cage or power rack such that a user can utilize the device without the need for the user to work the massager with their hands.

These, and other objects and advantages, will be readily appreciable from the following description of preferred embodiments and from the accompanying drawings and claims.

BRIEF DESCRIPTION OF THE SEVERAL VIEWS OF THE DRAWINGS

The nature and mode of operation of the present disclosure will now be more fully described in the following detailed description of the embodiments taken with the accompanying figures, in which.

DETAILED DESCRIPTION OF EMBODIMENTS

At the outset, it should be appreciated that like drawing numbers on different drawing views identify identical, or functionally similar, structural elements. While the embodiments are described with respect to what is presently considered to be the preferred aspects, it is to be understood that the invention as claimed is not limited to the disclosed aspect. The present invention is intended to include various modifications and equivalent arrangements within the spirit and scope of the appended claims.

The term "pressure clamp" as used in the present disclosure is intended to mean any device that secures objects to prevent their movement or separation by the application a force, e.g., a circumferential force. The term "carabiner" as used in the present disclosure is intended to mean a generally D-shaped or oblong connector with one spring-hinged side which permits the fastening of other pieces of equipment. The term "ratchet" as used in the present disclosure is intended to mean any mechanical device that allows continuous linear or rotary motion in one direction while preventing motion in the opposite direction.

Furthermore, it is understood that this disclosure is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
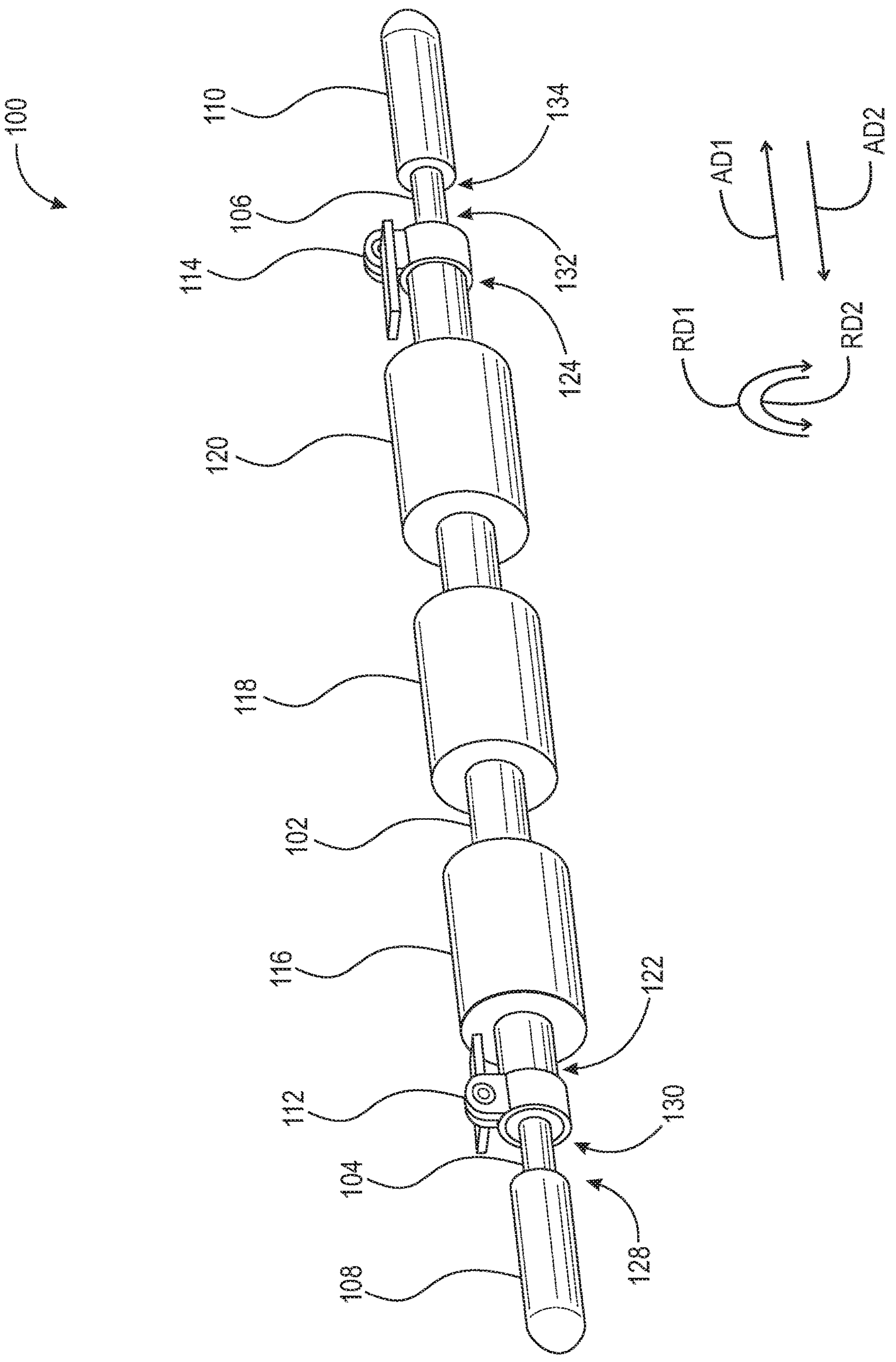
FIG. 1 is a perspective view of a first embodiment of a roller device as described herein.

Adverting now to the Figures, FIG. 1 is a perspective view of roller device 100. Roller device 100 includes first tube 102, first rod 104, second rod 106, first handle 108, second handle 110, first pressure clamp 112, second pressure clamp 114, first roller 116, second roller 118, and third roller 120. First tube 102 includes first end 122, second end 124, and through-bore 126 (not shown). Through-bore 126 of first tube 102 is concentric with, and passes completely through, first tube 102. First rod 104 has first end 128 and second end 130. First end 128 of first rod 104 is fixedly secured to handle 108. Second end 130 of first rod 104 is arranged to slide within, and telescopingly engage with, through-bore 126 of first tube 102. Second rod 106 has first end 132 and second end 134. First end 132 of second rod 106 is arranged to slide within, and telescopingly with, through-bore 126 of first tube 102. Second end 134 of second rod 106 is fixedly secured to second handle 110. First handle 108 and second handle 110 are depicted as substantially cylindrical members with one rounded end and can be made of various materials, e.g., rubber, foam, or plastic such as high-density polyethylene. First handle 108 and second handle 110 are intended to be gripped by a user's hand, or engage and be supported by brackets 136 and 144 described infra, such that a pressure force may be exerted by device 100 to a user's muscle.

First pressure clamp 112 is fixedly secured to first end 122 of first tube 102 and arranged between first rod 104 and first tube 102. When first pressure clamp 112 is disengaged, first rod 104 can slide within, and telescopingly engage with, through-bore 126 of first tube 102. When engaged, first pressure clamp 112 is operatively arranged to provide a pressure force about the circumference of first rod 104 and prevent movement of first rod 104 in both axial direction AD1 and axial direction AD2. Similarly, second pressure clamp 114 is fixedly secured to second end 124 of first tube 102 and arranged between second rod 106 and first tube 102. When second pressure clamp 114 is disengaged, second rod 106 can slide within, and telescopingly engage with, through-bore 126 of first tube 102. When engaged, second pressure clamp 114 is operatively arranged to provide a pressure force about the circumference of second rod 106 and prevent movement of second rod 106 in both axial direction AD1 and axial direction AD2. Roller device 100 further includes first roller 116, second roller 118, and third roller 120. Rollers 116, 118, and 120 are arranged about first tube 102. Roller 116, 118, and 120 are operatively arranged to rotate in rotational direction RD1 and/or second rotational direction RD2. It should be appreciated that although three rollers, i.e., rollers 116, 118, and 120 are depicted, additional rollers may be provided. Furthermore, it is contemplated herein that at least one roller, i.e., one or more rollers could be disposed about first tube 102.

Figure 2:
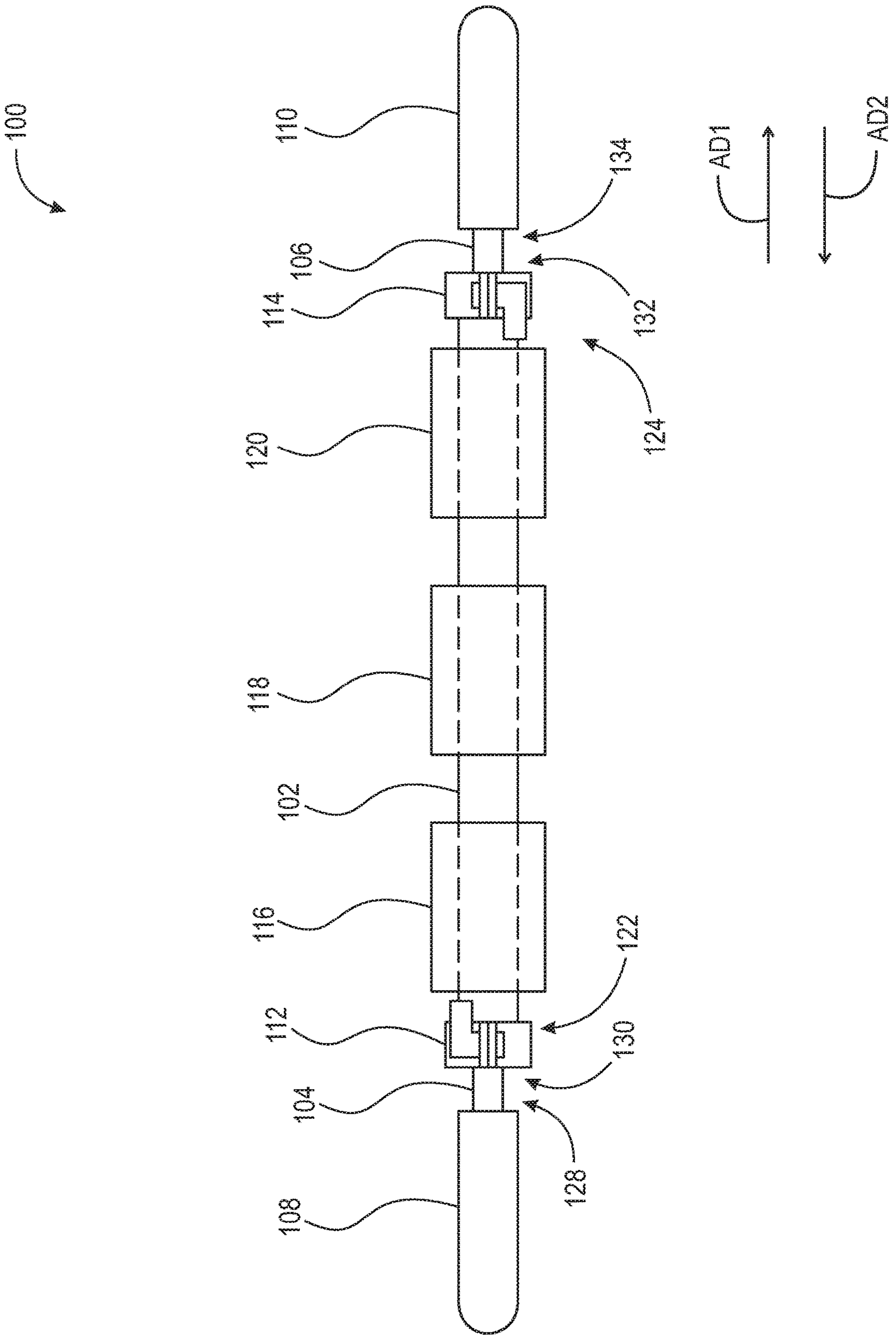
FIG. 2 is a side elevational view of a first embodiment of a roller device as described herein.

FIG. 2 is a side elevational view of roller device 100. FIG. 2 illustrates that first tube 102 is a continuous tube which extends between first pressure clamp 112 and second pressure clamp 114. It should be appreciated that first tube 102 could be embodied as a segmented tube between each roller 116, 118, and 120. It should further be appreciated that rollers 116, 118, and 120 can be made of rubber, foam, or a hard plastic, such as high-density polyethylene.

Figure 3B:
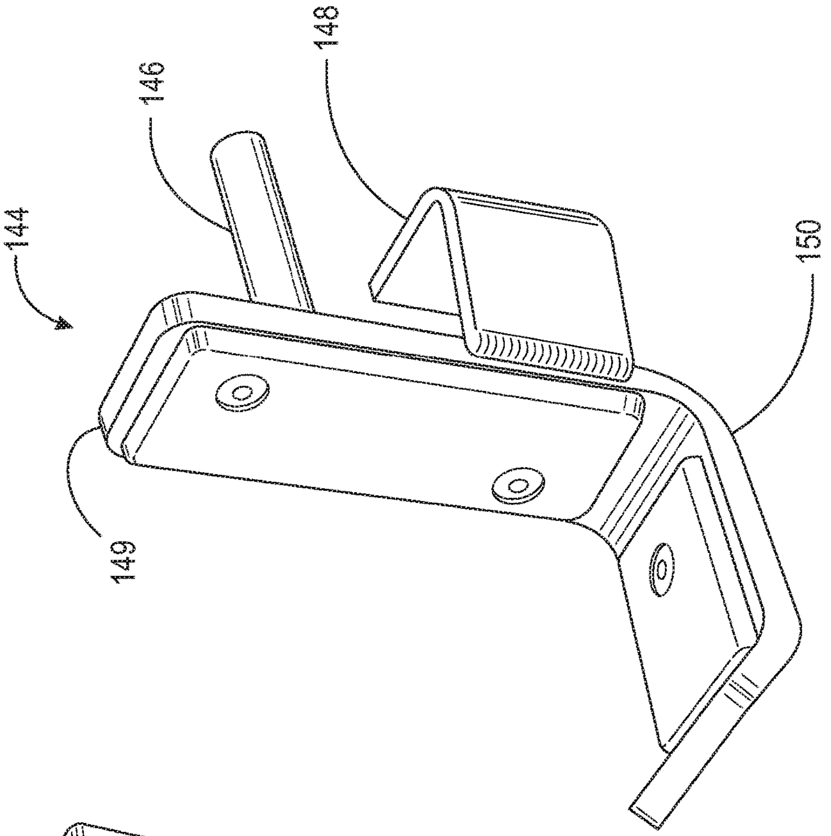
FIG. 3B is a perspective view of a second embodiment of a bracket used in conjunction with the various roller devices as described herein.
Figure 3A:
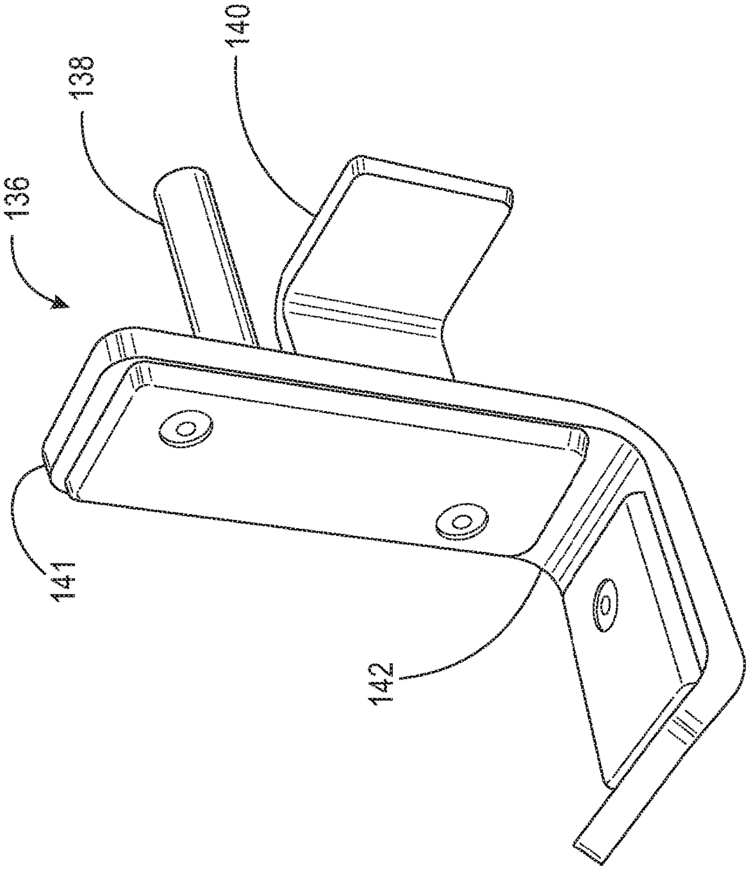
FIG. 3A is a perspective view of a first embodiment of a bracket used in conjunction with the various roller devices described herein.

FIG. 3A is a perspective view of a bracket 136. Bracket 136 includes pin 138, guard 140, back plate 141, and support 142. Pin 136 is fixedly secured to back plate 141 and arranged to slidingly engage with first plurality of through-bores 156 (shown in FIG. 4). Guard 140 is arranged to prevent bracket 136 from slidingly disengaging with rack 154 (shown in FIG. 4). Back plate 141 is positioned between pin 138 and support 142. Support 142 is integrally connected with back plate 141 and arranged to hold a device when in use in association with rack 154, e.g., a bar used for squatting or bench-pressing, or roller device 100. As embodied in FIG. 3A, support 142 is depicted as a flat plate with a lip on one side and back plate 141 on the other to prevent disengagement of a device in any direction orthogonal to the surface of back plate 141. It should be appreciated that back plate 141 and support 142 can include pads, as illustrated, to prevent excessive wear of bracket 136. FIG. 3B is a perspective view of bracket 144 used in conjunction with roller device 100. Bracket 144 includes pin 146, guard 148, back plate 149, and support 150. Pin 146 is fixedly secured to back plate 149 and arranged to slidingly engage with second plurality of through-bores 158 (shown in FIG. 4). Guard 148 is arranged to prevent bracket 144 from slidingly disengaging with rack 154. Back plate 141 is positioned between pin 146 and support 150. Support 150 is integrally connected with back plate 149 and arranged to hold a device when in use in association with rack 154, e.g., a bar used for squatting or bench-pressing, or roller device 100. As embodied in FIG. 3B, support 150 is depicted as a flat plate with a lip on one side and back plate 149 on the other to prevent disengagement of a device in any direction orthogonal to the surface of back plate 149. It should be appreciated that back plate 149 and support 150 can include pads, as illustrated, to prevent excessive wear of bracket 144.

Figure 4:
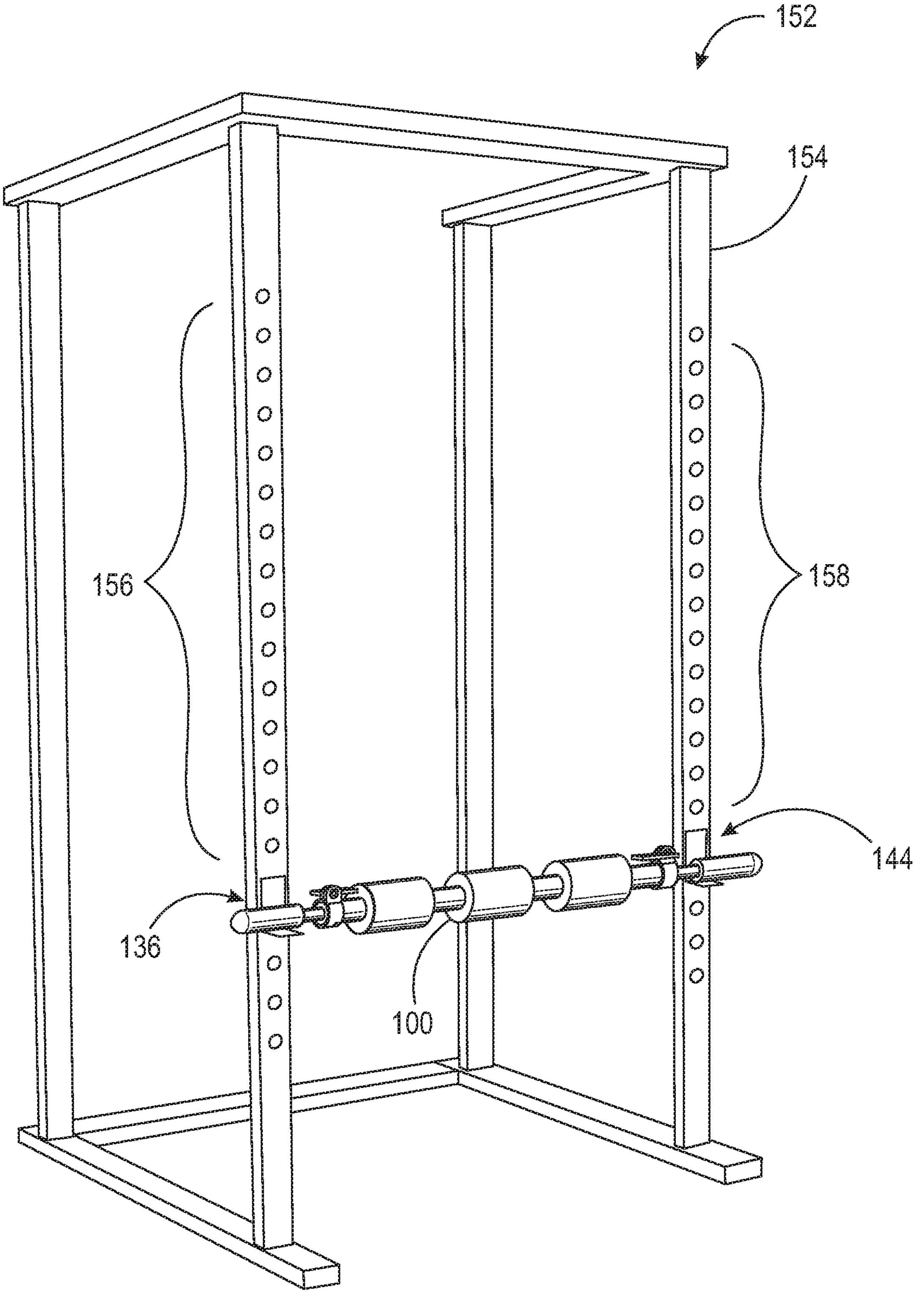
FIG. 4 is a perspective view of a first embodiment of a rack-roller assembly as described herein.

FIG. 4 is a perspective view of a rack-roller assembly 152. Rack-roller assembly 152 includes rack 154, first plurality of through-bores 156, second plurality of through-bores 158, brackets 136 and 144, and roller device 100. Device 100 rests on and is supported by brackets 136 and 144. To compensate for variations in size of different racks and rack assemblies, device 100 is capable of telescoping as discussed supra. Device 100 may telescope to varying lengths such that handles 108 and 110, described supra, can contact and be supported by brackets 136 and 144, simultaneously. It should be appreciated that brackets 136 and 144 do not have to engage with horizontally corresponding through-bores in first plurality of through-bores 156 and second plurality of through-bores 158, i.e., device 100 does not have to be level when resting on brackets 136 and 144. In fact, it may be desirable to position brackets 136 and 144 at different heights, corresponding to different through-bores of first plurality of through-bores 156 and second plurality of through-bores 158 so that different muscle areas, e.g., a user's latissimus dorsi, can be massaged easily.

Figure 5:
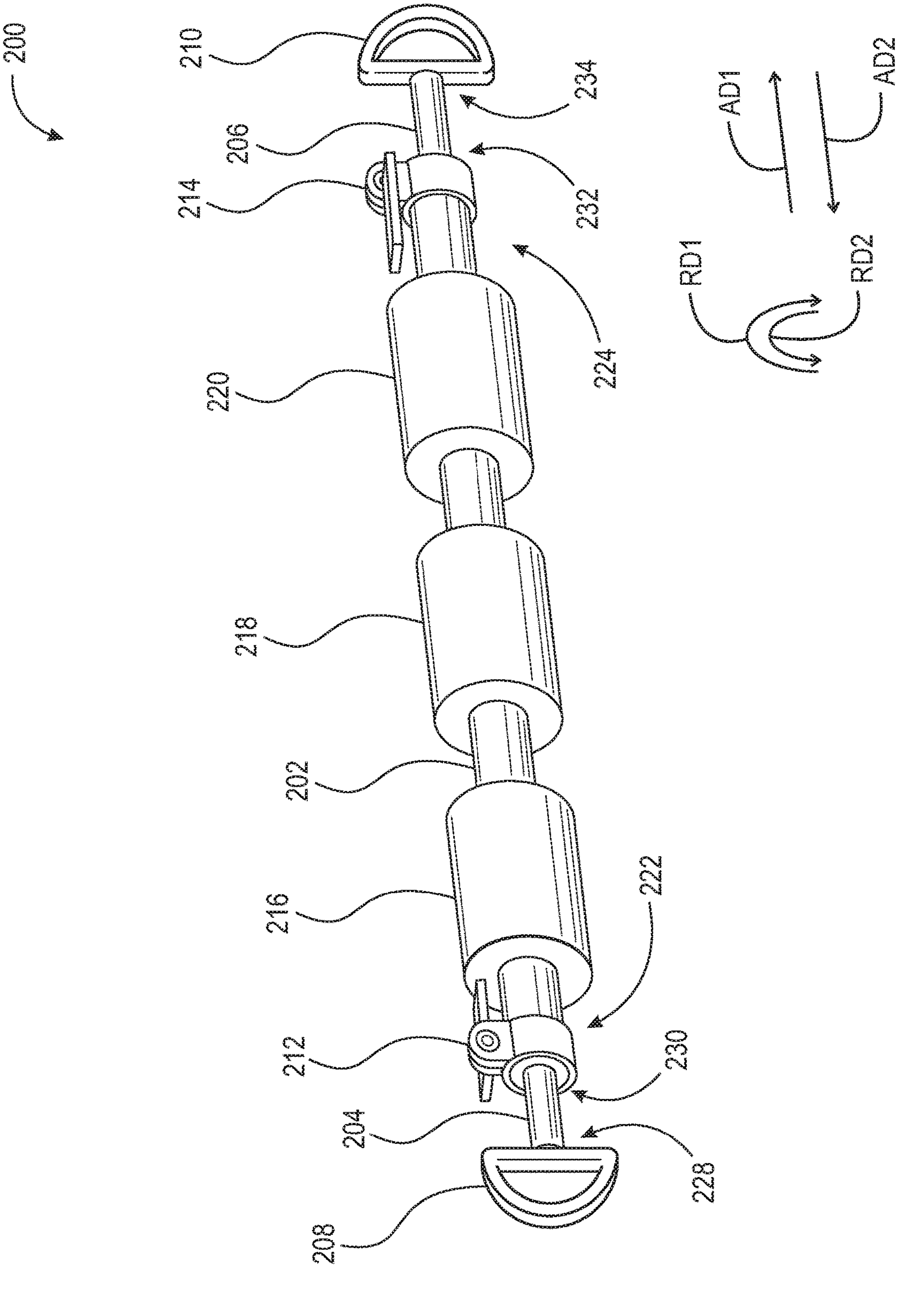
FIG. 5 is a perspective view of a second embodiment of a roller device as described herein.

FIG. 5 is a perspective view of roller device 200. Roller device 200 includes first tube 202, first rod 204, second rod 206, first connector 208, second connector 210, first pressure clamp 212, second pressure clamp 214, first roller 216, second roller 218, and third roller 220. First tube 202 includes first end 222, second end 224, and through-bore 226 (not shown). Through-bore 226 of first tube 202 is concentric with, and passes completely through, first tube 202. First rod 204 has first end 228 and second end 230. First end 228 of first rod 204 is fixedly secured to handle 208. Second end 230 of first rod 204 is arranged to slide within, and telescopingly engage with, through-bore 226 of first tube 202. Second rod 206 has first end 232 and second end 234. First end 232 of second rod 206 is arranged to slide within, and telescopingly with, through-bore 226 of first tube 202. Second end 234 of second rod 206 is fixedly secured to second connector 210. First connector 208 and second connector 210 are depicted as substantially D-shaped members arranged to engage with brackets 236 and 244 described infra and can be made of various materials, e.g., rubber, foam, high-density polyethylene, or stainless steel. First connector 208 and second connector 210 are intended to engage and be supported by brackets 236 and 244 described infra, such that a pressure force may be exerted by device 200 to a user's muscle.

First pressure clamp 212 is fixedly secured to first end 222 of first tube 202 and arranged between first rod 204 and first tube 202. When first pressure clamp 212 is disengaged, first rod 204 can slide within, and telescopingly engage with, through-bore 226 of first tube 202. When engaged, first pressure clamp 212 is operatively arranged to provide a pressure force about the circumference of first rod 204 and prevent movement of first rod 204 in both axial direction AD1 and axial direction AD2. Similarly, second pressure clamp 214 is fixedly secured to second end 224 of first tube 202 and arranged between second rod 206 and first tube 202. When second pressure clamp 214 is disengaged, second rod 206 can slide within, and telescopingly engage with, through-bore 226 of first tube 202. When engaged, second pressure clamp 214 is operatively arranged to provide a pressure force about the circumference of second rod 206 and prevent movement of second rod 206 in both axial direction AD1 and axial direction AD2. Roller device 200 further includes first roller 216, second roller 218, and third roller 220. Rollers 216, 218, and 220 are arranged about first tube 202. Roller 216, 218, and 220 are operatively arranged to rotate in rotational direction RD1 and/or second rotational direction RD2. It should be appreciated that although three rollers, i.e., rollers 216, 218, and 220 are depicted, additional rollers may be provided. Furthermore, it is contemplated herein that at least one roller, i.e., one or more roller could be disposed about first tube 202.

Figure 6:
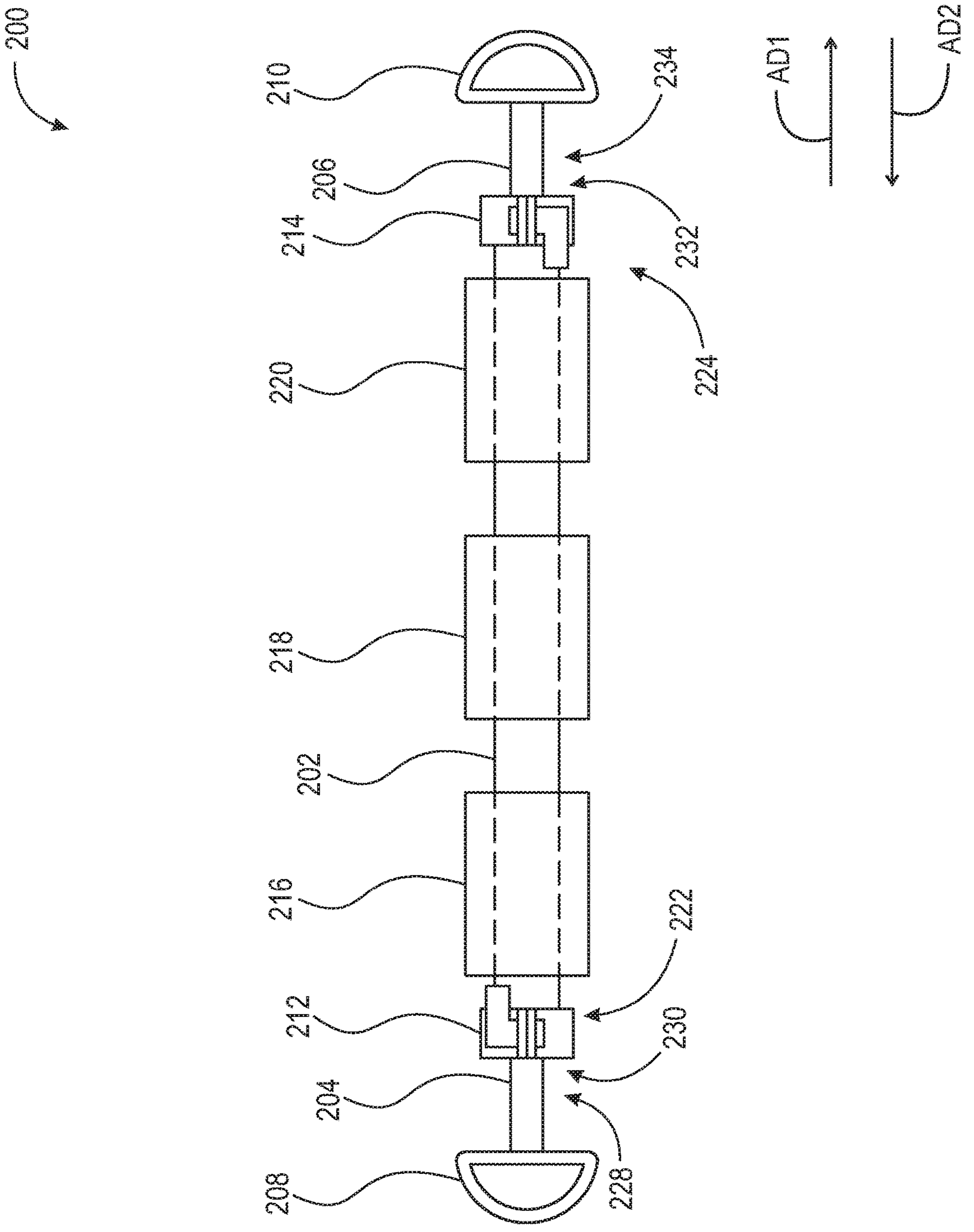
FIG. 6 is a side elevational view of a second embodiment of a roller device as described herein.

FIG. 6 is a side elevational view of a roller device 200. FIG. 6 illustrates that first tube 202 is a continuous tube which extends between first pressure clamp 212 and second pressure clamp 214. It should be appreciated that first tube 202 could be embodied as a segmented tube between each roller 216, 218, and 220. It should further be appreciated that rollers 216, 218, and 220 can be made of rubber, foam, or a hard plastic, such as high-density polyethylene.

Figure 7A:
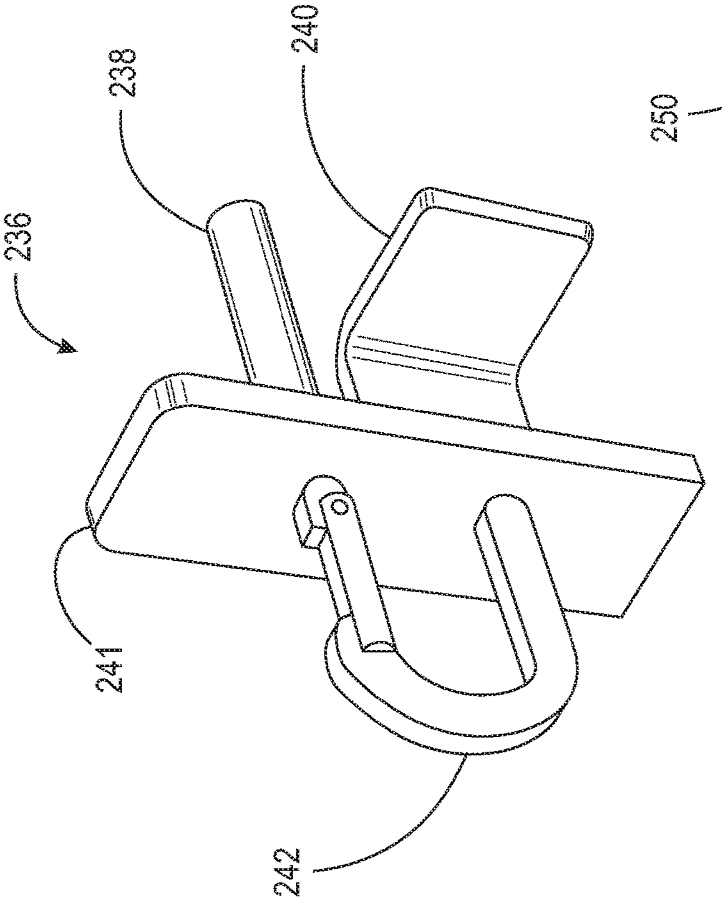
FIG. 7A is a perspective view of a third embodiment of a bracket used in conjunction with the various roller devices described herein.
Figure 7B:
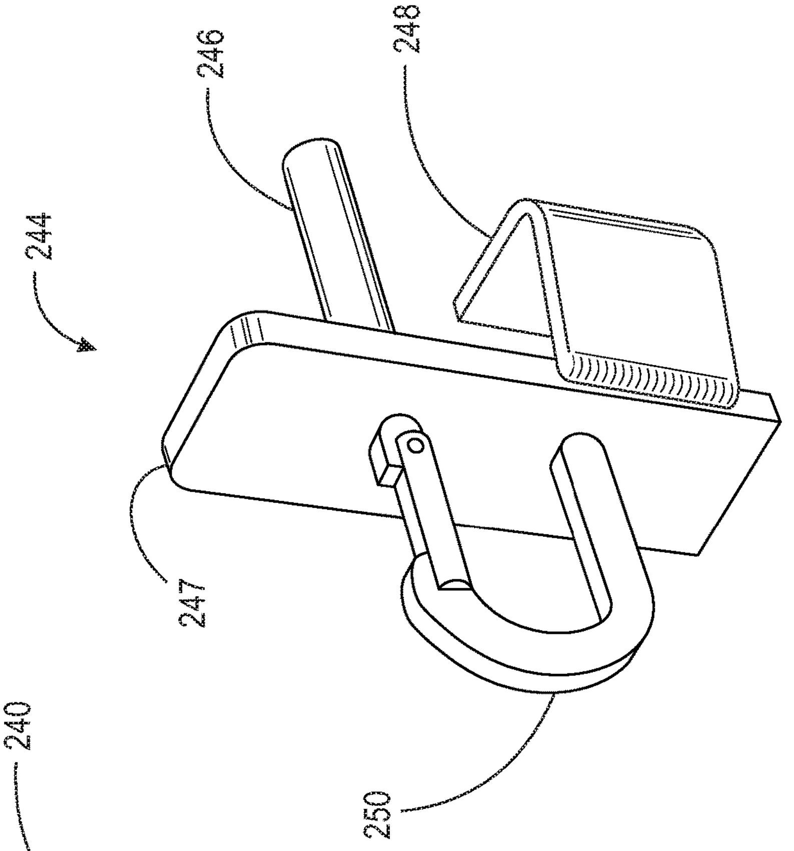
FIG. 7B is a perspective view of a fourth embodiment of a bracket used in conjunction with the various roller devices as described herein.

FIG. 7A is a perspective view of a bracket 236 used in conjunction with roller device 200. Bracket 236 includes pin 238, guard 240, back plate 241, and support 242. Pin 236 is fixedly secured to back plate 241 and arranged to slidingly engage with first plurality of through-bores 256 (shown in FIG. 8). Guard 240 is arranged to prevent bracket 236 from slidingly disengaging with rack 254 (shown in FIG. 8). Back plate 241 is positioned between pin 238 and support 242. Support 242 is integrally connected with back plate 241 and arranged to hold a device when in use in association with rack 254, e.g., roller device 200. As embodied in FIG. 7A, support 242 is depicted as a substantially U-shaped carabiner integrally connected with back plate 241 and arranged to prevent displacement of device 200. Much like a carabiner clip, support 242 includes a spring-biased gate that allows a piece of equipment to quickly clip into and be secured by support 242. FIG. 7B is a perspective view of bracket 244 used in conjunction with roller device 200. Bracket 244 includes pin 246, guard 248, back plate 249, and support 250. Pin 246 is fixedly secured to back plate 249 and arranged to slidingly engage with second plurality of through-bores 258 (shown in FIG. 8). Guard 248 is arranged to prevent bracket 244 from slidingly disengaging with rack 254. Back plate 241 is positioned between pin 246 and support 250. Support 250 is integrally connected with back plate 249 and arranged to hold a device when in use in association with rack 254, e.g., roller device 200. As embodied in FIG. 7B, support 250 is depicted as a substantially U-shaped carabiner integrally connected with back plate 249 and arranged to prevent displacement of device 200. Much like a carabiner clip, support 250 includes a spring-biased gate that allows a piece of equipment to quickly clip into and be secured by support 250.

Figure 8:
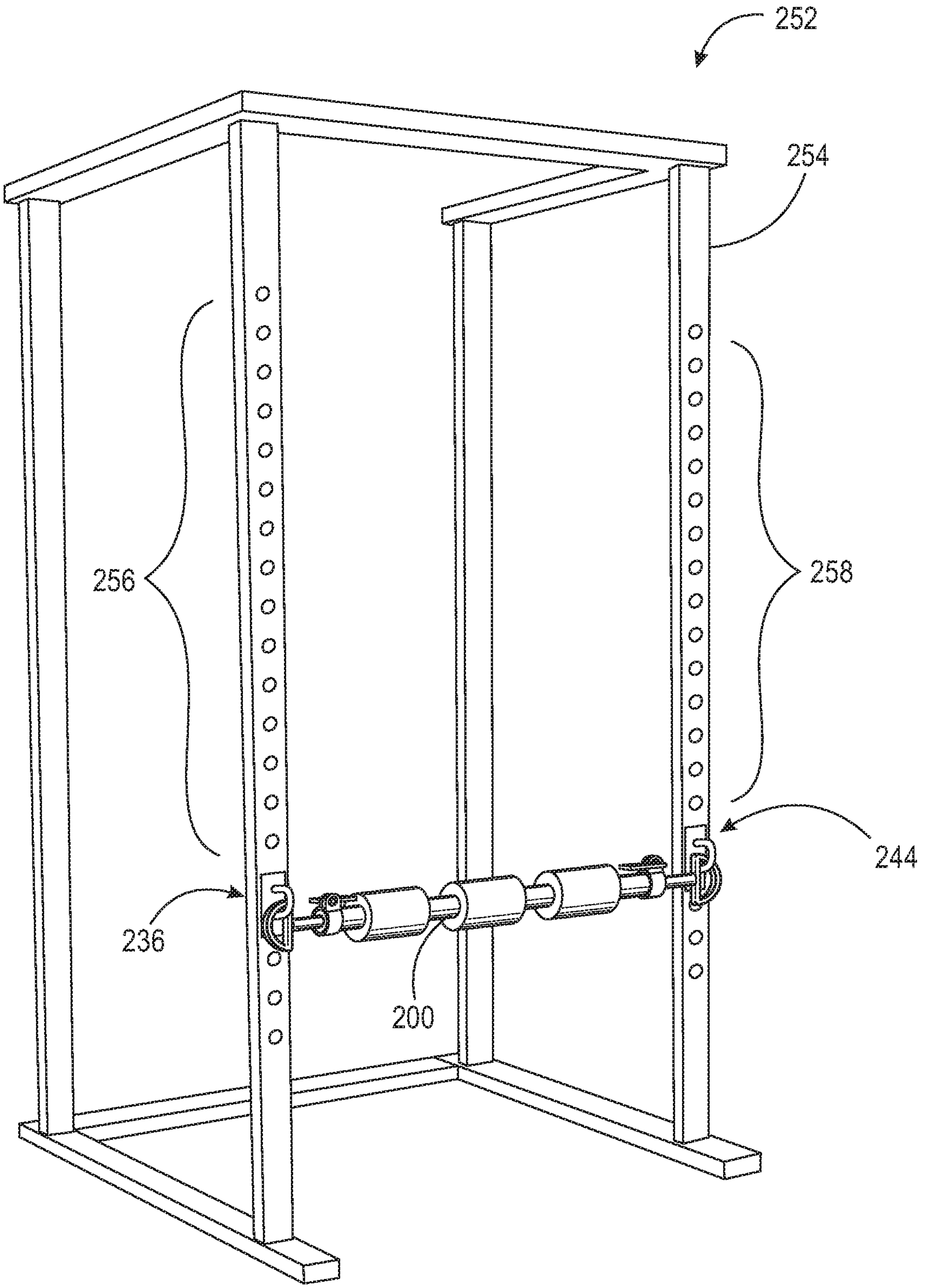
FIG. 8 is a perspective view of a second embodiment of a rack-roller assembly as described herein.

FIG. 8 is a perspective view of a rack-roller assembly 252. Rack-roller assembly 252 includes rack 254, first plurality of through-bores 256, second plurality of through-bores 258, brackets 236 and 244, and roller device 200. Device 200 clips to and is supported by brackets 236 and 244. To compensate for variations in size of different racks and rack assemblies, device 200 is capable of telescoping as discussed supra. Device 200 may telescope to varying lengths such that connectors 208 and 210, described supra, can clip into and be supported by brackets 236 and 244, simultaneously. It should be appreciated that brackets 236 and 244 do not have to engage with horizontally corresponding through-bores in first plurality of through-bores 256 and second plurality of through-bores 258, i.e., device 200 does not have to be level when resting in brackets 236 and 244. In fact, it may be desirable to position brackets 236 and 244 at different heights, corresponding to different through-bores of first plurality of through-bores 256 and second plurality of through-bores 258 so that different muscle areas, e.g., a user's latissimus dorsi, can be massaged easily.

Figure 9:
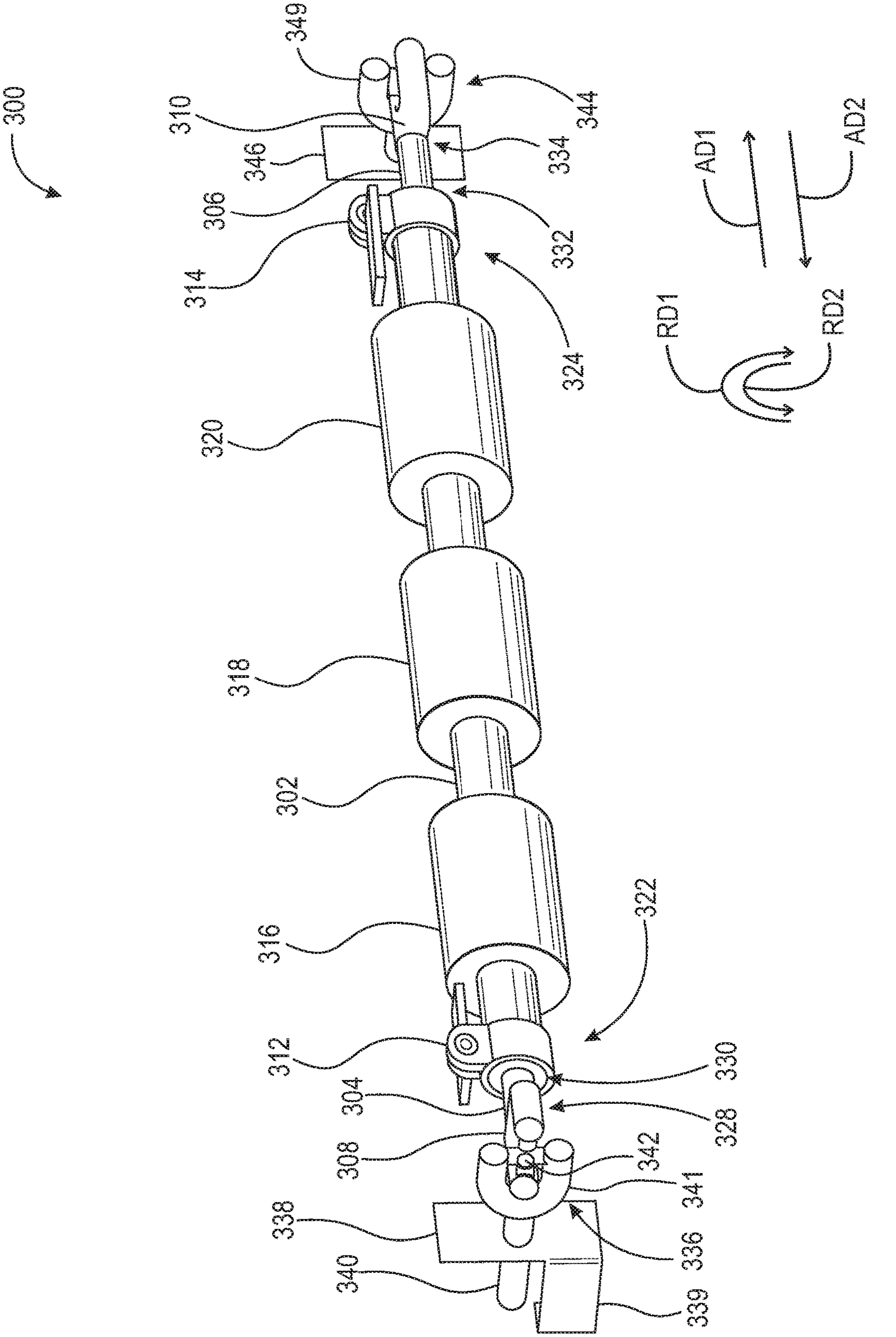
FIG. 9 is a perspective view of a third embodiment of a roller device used in conjunction with a fifth and a sixth embodiment of a bracket as described herein.

FIG. 9 is a perspective view of roller device 300. Roller device 300 includes first tube 302, first rod 304, second rod 306, first fork 308, second fork 310, first pressure clamp 312, second pressure clamp 314, first roller 316, second roller 318, and third roller 320. First tube 302 includes first end 322, second end 324, and through-bore 326 (not shown). Through-bore 326 of first tube 302 is concentric with, and passes completely through, first tube 302. First rod 304 has first end 328 and second end 330. First end 328 of first rod 304 is fixedly secured to first fork 308. Second end 330 of first rod 304 is arranged to slide within, and telescopingly engage with, through-bore 326 of first tube 302. Second rod 306 has first end 332 and second end 334. First end 332 of second rod 306 is arranged to slide within, and telescopingly with, through-bore 326 of first tube 302. Second end 334 of second rod 306 is fixedly secured to second fork 310. First fork 308 and second fork 310 are depicted as fork shaped members, i.e., having a first prong, a second prong, and a space between the first and second prongs. First fork 308 and second fork 310 are intended engage and be supported by joints 336 and 346 described infra, such that a pressure force may be exerted by device 300 to a user's muscle.

First pressure clamp 312 is fixedly secured to first end 322 of first tube 302 and arranged between first rod 304 and first tube 302. When first pressure clamp 312 is disengaged, first rod 304 can slide within, and telescopingly engage with, through-bore 326 of first tube 302. When engaged, first pressure clamp 312 is operatively arranged to provide a pressure force about the circumference of first rod 304 and prevent movement of first rod 304 in both axial direction AD1 and axial direction AD2. Similarly, second pressure clamp 314 is fixedly secured to second end 324 of first tube 302 and arranged between second rod 306 and first tube 302. When second pressure clamp 314 is disengaged, second rod 306 can slide within, and telescopingly engage with, through-bore 326 of first tube 302. When engaged, second pressure clamp 314 is operatively arranged to provide a pressure force about the circumference of second rod 306 and prevent movement of second rod 306 in both axial direction AD1 and axial direction AD2. Roller device 300 further includes first roller 316, second roller 318, and third roller 320. Rollers 316, 318, and 320 are arranged about first tube 302. Roller 316, 318, and 320 are operatively arranged to rotate in rotational direction RD1 and/or second rotational direction RD2. It should be appreciated that although three rollers, i.e., rollers 316, 318, and 320 are depicted, additional rollers may be provided. Furthermore, it is contemplated herein that at least one roller, i.e., one or more rollers could be disposed about first tube 302.

FIG. 9 further illustrates joints 336 and 344. Joint 336 includes plate 338, guard 339, pin 340, fork 341, and cross 342. Pin 340 is fixedly secured to plate 338 and arranged to slidingly engage with first plurality of through-bores 356 (shown in FIG. 11). Guard 339 is arranged to prevent joint 336 from slidingly disengaging with rack 354 (shown in FIG. 11). Plate 338 is positioned between pin 340 and fork 341. Fork 341 is integrally connected with plate 338 and arranged to hold a device when in use in association with rack 354, e.g., a bar used for squatting or bench-pressing, or roller device 300. As embodied in FIG. 9, fork 341 is depicted as a fork shaped member integrally connected with plate 338 and arranged to prevent displacement of device 300. Fork 341 of joint 336 is arranged to connect with fork 308 of roller device 300 via cross 342. Cross 342 allows for rotation of device 300 with respect to joint 336 without disengaging with joint 336. Joint 336, when connected to device 300 partially supports device 300 such that that a pressure force may be exerted by device 300 to a user's muscle. Joint 344 includes plate 346, guard 347, pin 348, fork 349, and cross 350. Pin 348 (shown in FIG. 10) is fixedly secured to plate 346 and arranged to slidingly engage with first plurality of through-bores 356 (shown in FIG. 11). Guard 347 (shown in FIG. 10) is arranged to prevent joint 344 from slidingly disengaging with rack 354 (shown in FIG. 11). Plate 346 is positioned between pin 348 and fork 349. Fork 349 is integrally connected with plate 346 and arranged to hold a device when in use in association with rack 354, e.g., a bar used for squatting or bench-pressing, or roller device 300. It should be appreciated that forks 341 and 349 can be made from various materials e.g., stainless steel. As embodied in FIG. 9, fork 349 is depicted as a fork shaped member integrally connected with plate 346 and arranged to prevent displacement of device 300. Fork 349 of joint 344 is arranged to connect with fork 310 of roller device 300 via cross 350 (not shown). Cross 350 allows for omnidirectional rotation of device 300 with respect to joint 344 without disengaging with joint 344. Joint 336, when connected to device 300 partially supports device 300 such that that a pressure force may be exerted by device 300 to a user's muscle. It should be appreciated that forks 308 and 310 along with first rod 304 and second rod 306, can be arranged to rotate within through bore 326. Further, it should be appreciated that forks 341 and 349 on joints 336 and 344, respectively, can also be arranged to rotate on joints 336 and 344.

Figure 10:
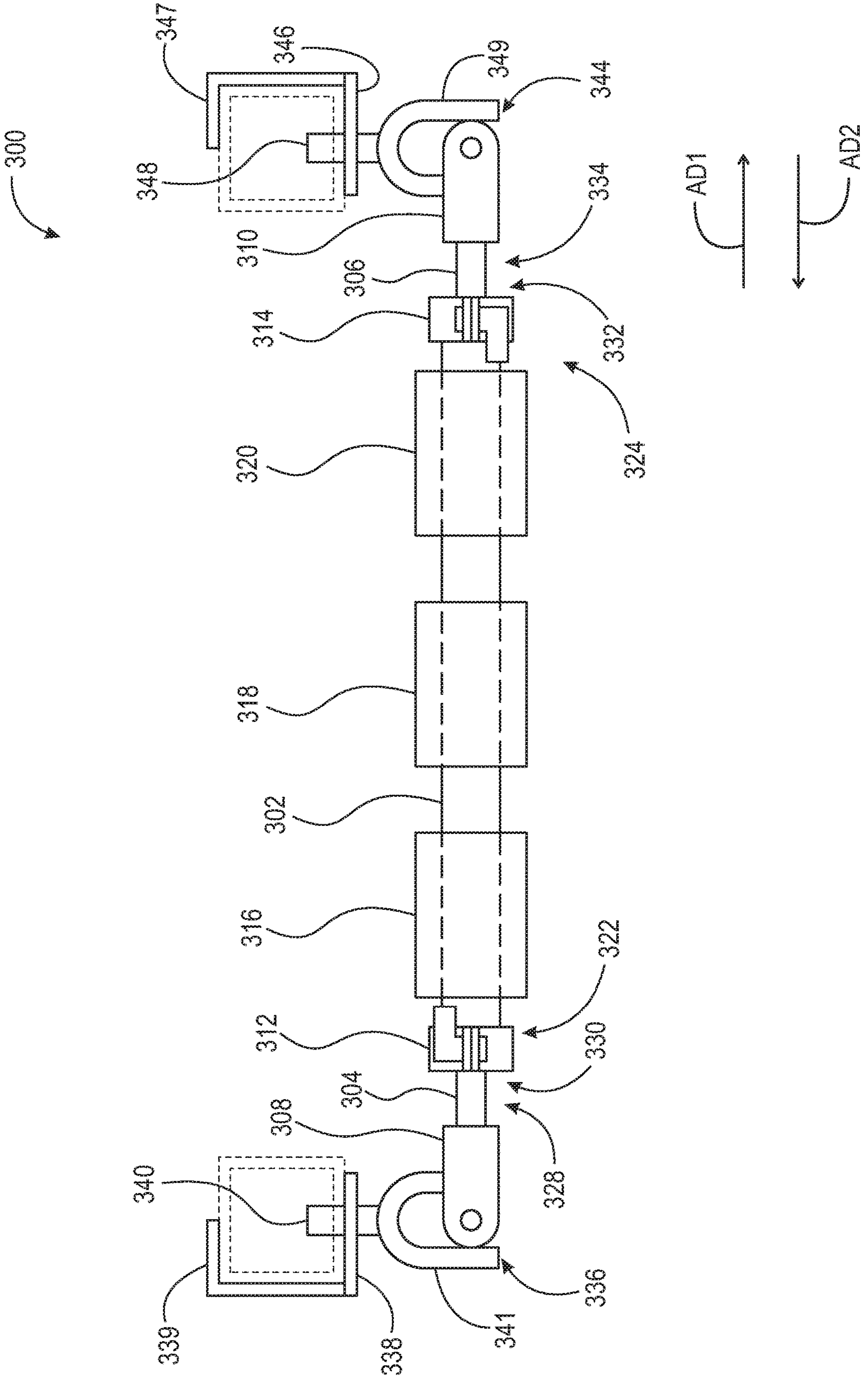
FIG. 10 is a side elevational view of a third embodiment of a roller device used in conjunction with a fifth and a sixth embodiment of a bracket as described herein.

FIG. 10 is a side elevational view of roller device 300. FIG. 10 illustrates that first tube 302 is a continuous tube which extends between first pressure clamp 312 and second pressure clamp 314. It should be appreciated that first tube 302 could be embodied as a segmented tube between each roller 316, 318, and 320. It should further be appreciated that rollers 316, 318, and 320 can be made of rubber, foam, or a hard plastic, such as high-density polyethylene.

Figure 11:
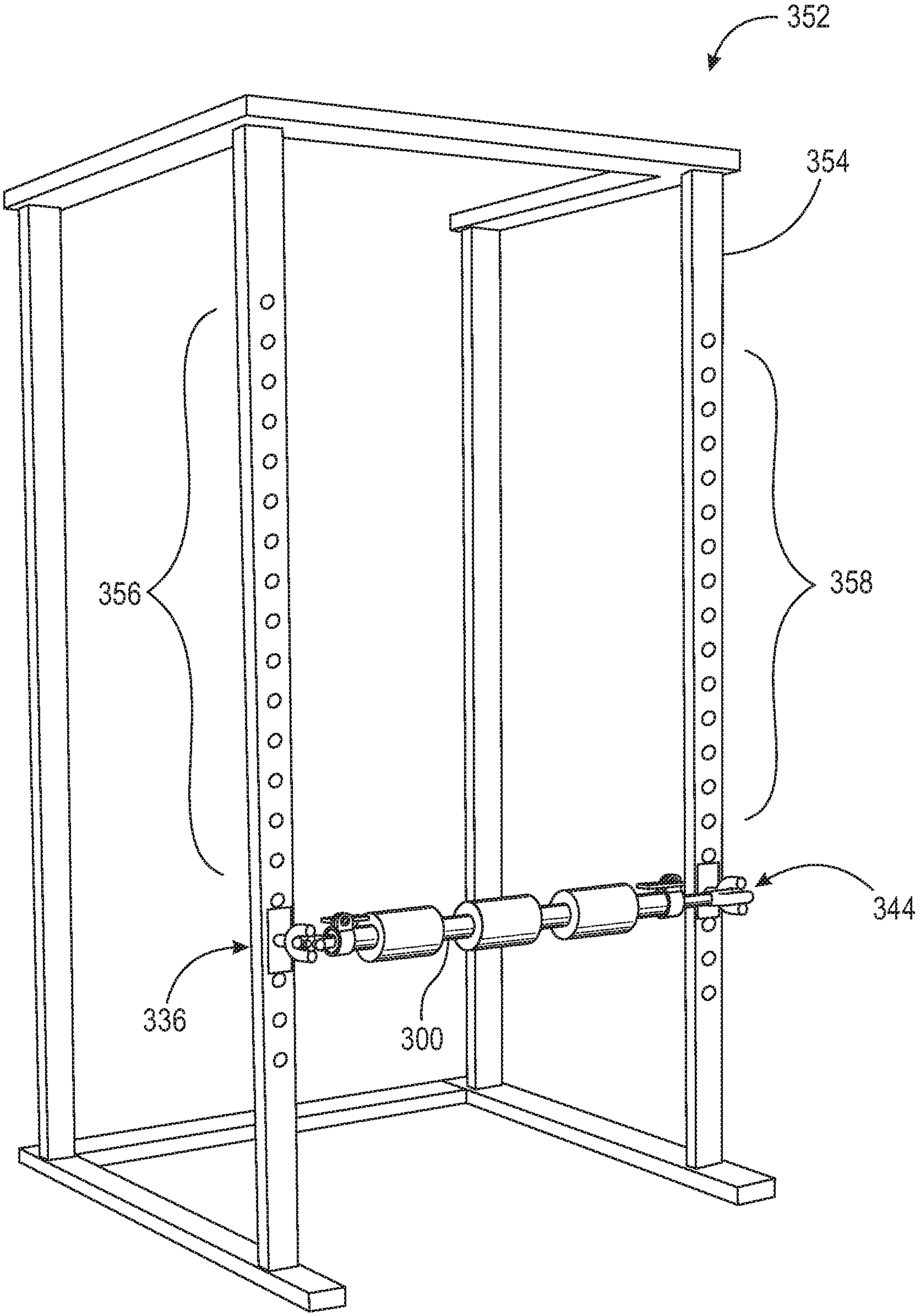
FIG. 11 is a perspective view of a third embodiment of a rack-roller assembly as described herein.

FIG. 11 is a perspective view of a rack-roller assembly 352. Rack-roller assembly 352 includes rack 354, first plurality of through-bores 356, second plurality of through-bores 358, joints 336 and 344, and roller device 300. Device 300 secures to and is supported by joints 336 and 344. To compensate for variations in size of different racks and rack assemblies, device 300 is capable of telescoping as discussed supra. Device 300 may telescope to varying lengths such that forks 308 and 310, described supra, can connect to and be supported by joints 336 and 344, simultaneously. It should be appreciated that joints 336 and 344 do not have to engage with horizontally corresponding through-bores in first plurality of through-bores 356 and second plurality of through-bores 358, i.e., device 300 does not have to be level when connected to joints 336 and 344. In fact, it may be desirable to position joints 336 and 344 at different heights, corresponding to different through-bores of first plurality of through-bores 356 and second plurality of through-bores 358 so that different muscle areas, e.g., a user's latissimus dorsi, can be massaged easily.

Figure 12:
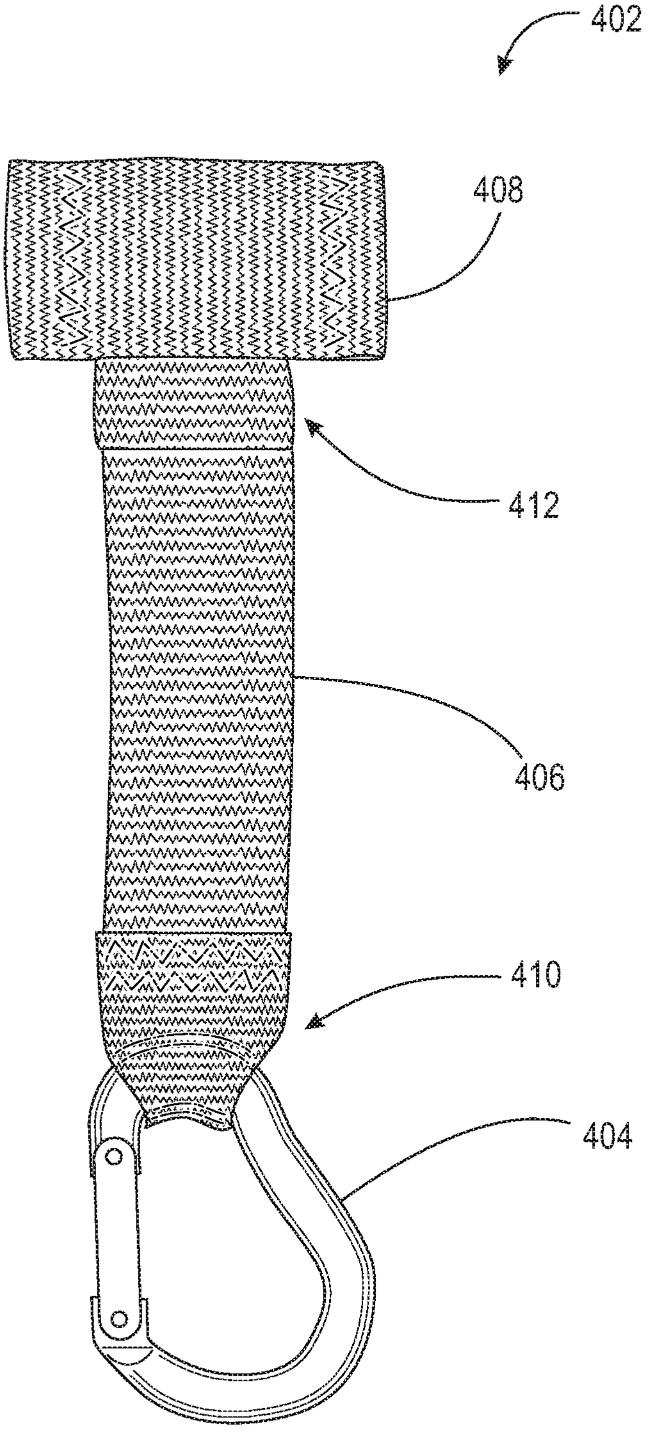
FIG. 12 is a side view of a door anchor as described herein.

FIG. 12 is a side view of door anchor 402 which can be used in association with roller device 400. Door anchor 402 includes a clip 404, a first strap 406, and a second strap 408. Clip 404 is depicted as a substantially D-shaped carabiner clip having a spring-biased gate arranged to quickly connect to a piece of equipment. First strap 406 has first end 410 and second end 412. First end 410 is arranged to secure to clip 404, and second end 412 is arranged to secure to second strap 408. Second strap 408 is secured to first strap 406 such that second strap 408 is substantially orthogonal to first strap 406. Second strap is operatively arranged to contact the back of door 416 described infra.

Figure 13:
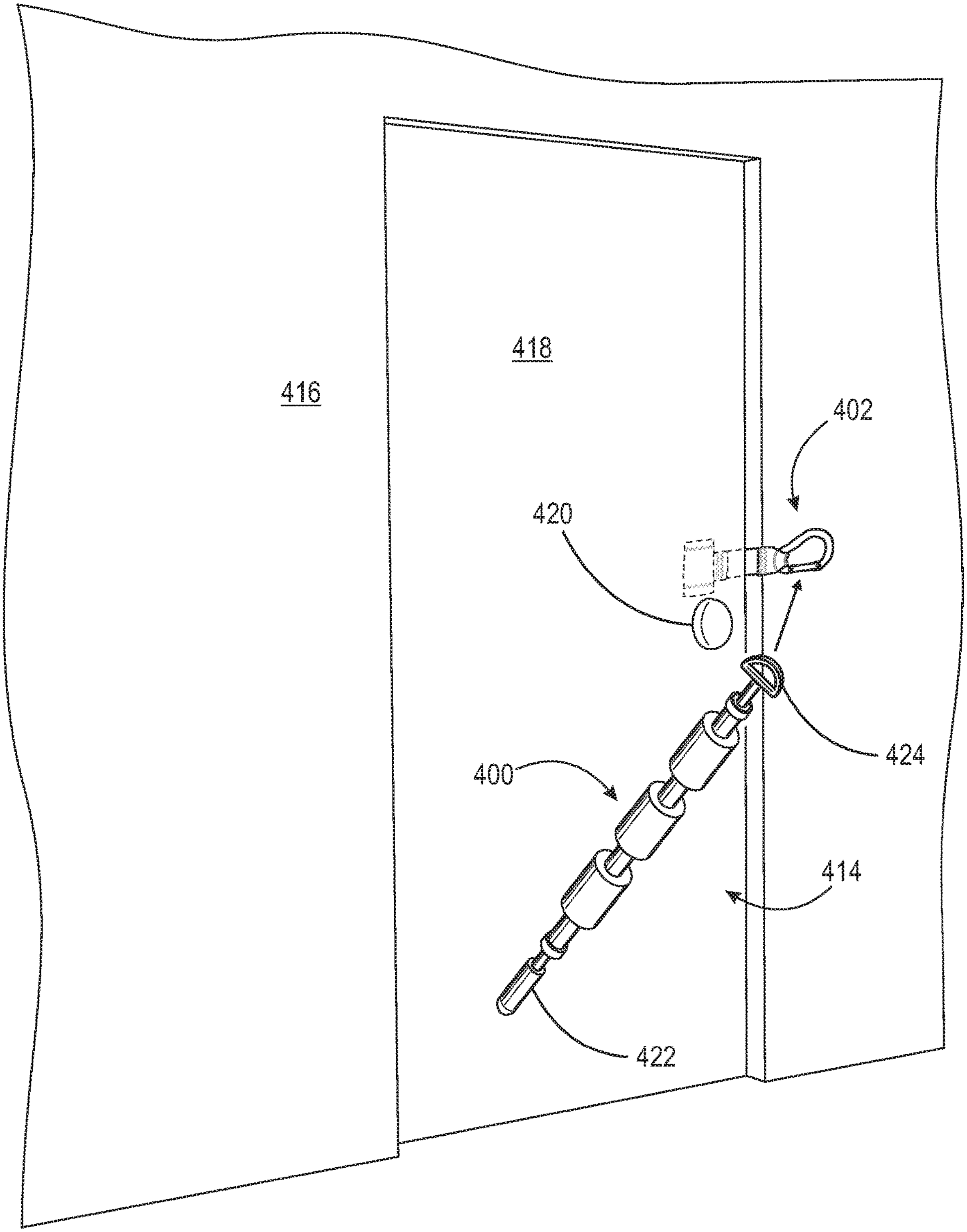
FIG. 13 is a perspective view a door anchor used in conjunction with a door and a fourth embodiment of a roller device as described herein.

FIG. 13 is a perspective view a door anchor 402 as used in association with roller device 400 in anchor-assembly 414. It should be appreciated that the handle and connectors depicted in association with roller devices 100, 200, and 300, can be mixed and matched as embodied by roller device 400. Roller device 400 comprises substantially the same elements as described in association with devices 100, 200, and 300, except that device 400 has 422 handle at one end, and connector 424 at the other. Handle 422 is substantially similar to handle 108 described supra. Connector 424 is substantially similar to connector 210 described supra. Door anchor 402, is initially positioned against the doorjamb of door 418, between door 418 and wall 416 and above door handle 420. Door 418 can then move to the closed position as depicted in FIG. 13 clamping door anchor 402 in place. After door anchor 402 is locked in place, connector 424 of roller device 400 can be clipped to clip 404 of door anchor 402. In this arrangement a user only needs to use one arm instead of two arms to grip handle 422 and impart a pressure force to roller device 400. By only using one arm it becomes possible to use door anchor 402 in conjunction with roller device 400 to massage muscle groups while only using one arm. It should be appreciated that by mixing handles and connectors as described above, it is possible to have roller devices 200 and 300 with a handle at one end and a connector at the other in which the devices could be used in a similar one-armed fashion as described above.

Figure 14:
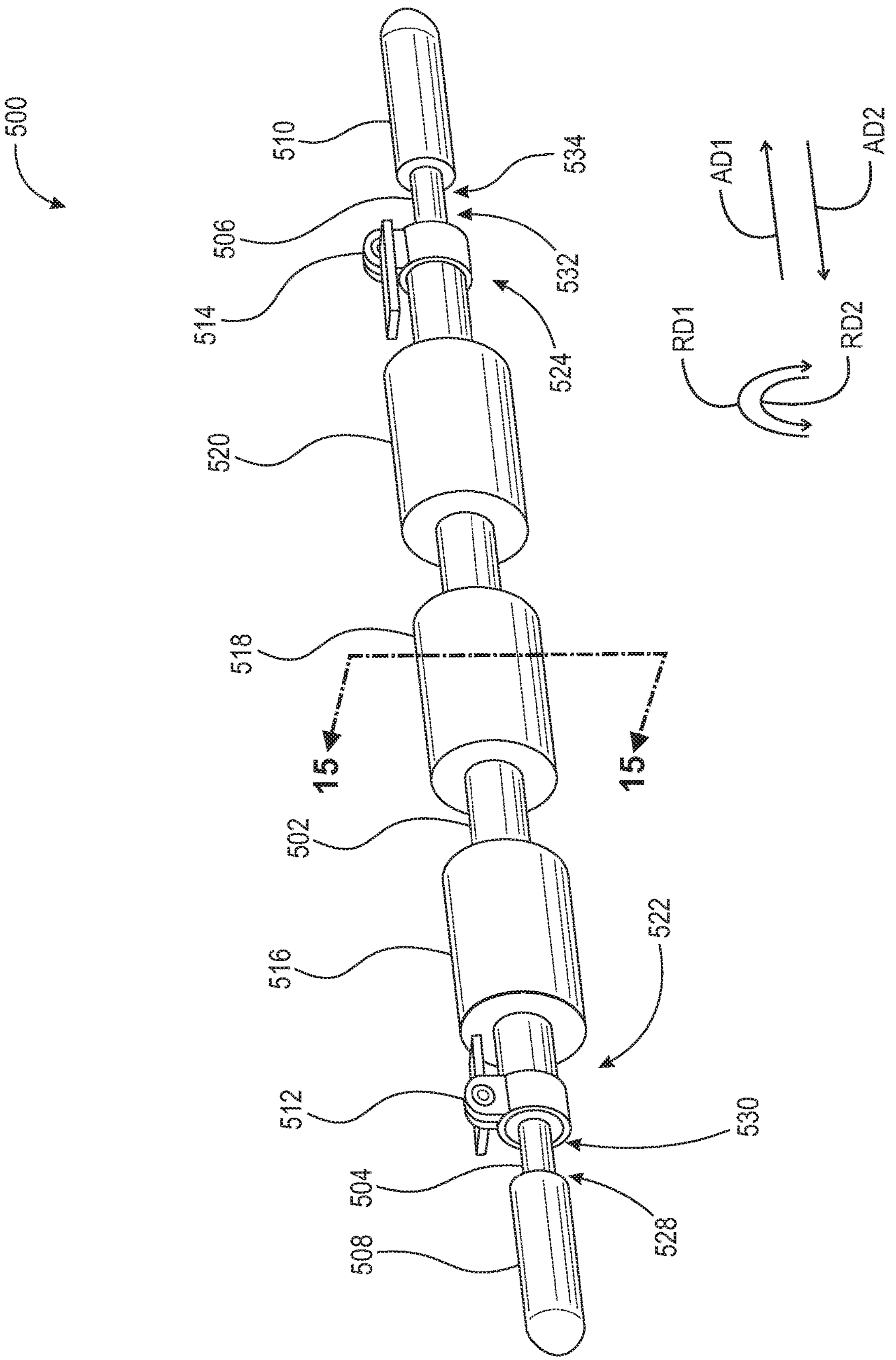
FIG. 14 is a perspective view of a fifth embodiment of a roller device as described herein.

FIG. 14 is a perspective view of roller device 500. Roller device 500 includes first tube 502, first rod 504, second rod 506, first handle 508, second handle 510, first pressure clamp 512, second pressure clamp 514, first roller 516, second roller 518, and third roller 520. First tube 502 includes first end 522, second end 524, and through-bore 526 (shown in FIG. 15). Through-bore 526 of first tube 502 is concentric with, and passes completely through, first tube 502. First rod 504 has first end 528 and second end 530. First end 528 of first rod 504 is fixedly secured to handle 508. Second end 530 of first rod 504 is arranged to slide within, and telescopingly engage with, through-bore 526 of first tube 502. Second rod 506 has first end 532 and second end 534. First end 532 of second rod 506 is arranged to slide within, and telescopingly with, through-bore 526 of first tube 502. Second end 534 of second rod 506 is fixedly secured to second handle 510. First handle 508 and second handle 510 are depicted as substantially cylindrical members with one rounded end and can be made of various materials, e.g., rubber, foam, or plastic such as high-density polyethylene. First handle 508 and second handle 510 are intended to be gripped by a user's hand, or engage and be supported by brackets (not shown), such that a pressure force may be exerted by device 500 to a user's muscle.

First pressure clamp 512 is fixedly secured to first end 522 of first tube 502 and arranged between first rod 504 and first tube 502. When first pressure clamp 512 is disengaged, first rod 504 can slide within, and telescopingly engage with, through-bore 526 of first tube 502. When engaged, first pressure clamp 512 is operatively arranged to provide a pressure force about the circumference of first rod 504 and prevent movement of first rod 504 in both axial direction AD1 and axial direction AD2. Similarly, second pressure clamp 514 is fixedly secured to second end 524 of first tube 502 and arranged between second rod 506 and first tube 502. When second pressure clamp 514 is disengaged, second rod 506 can slide within, and telescopingly engage with, through-bore 526 of first tube 502. When engaged, second pressure clamp 514 is operatively arranged to provide a pressure force about the circumference of second rod 506 and prevent movement of second rod 506 in both axial direction AD1 and axial direction AD2. Roller device 500 further includes first roller 516, second roller 518, and third roller 520. Rollers 516, 518, and 520 are arranged about first tube 502. Roller 516, 518, and 520 are operatively arranged to rotate in rotational direction RD1 and not in second rotational direction RD2. This this one-way rotation is made possible by plurality of teeth 538 (shown in FIG. 15) and stopping element 540 (shown in FIG. 15). It should be appreciated that although three rollers, i.e., rollers 516, 518, and 520 are depicted, additional rollers may be provided. Furthermore, it is contemplated herein that at least one roller, i.e., one or more rollers could be disposed about first tube 502.

Figure 15:
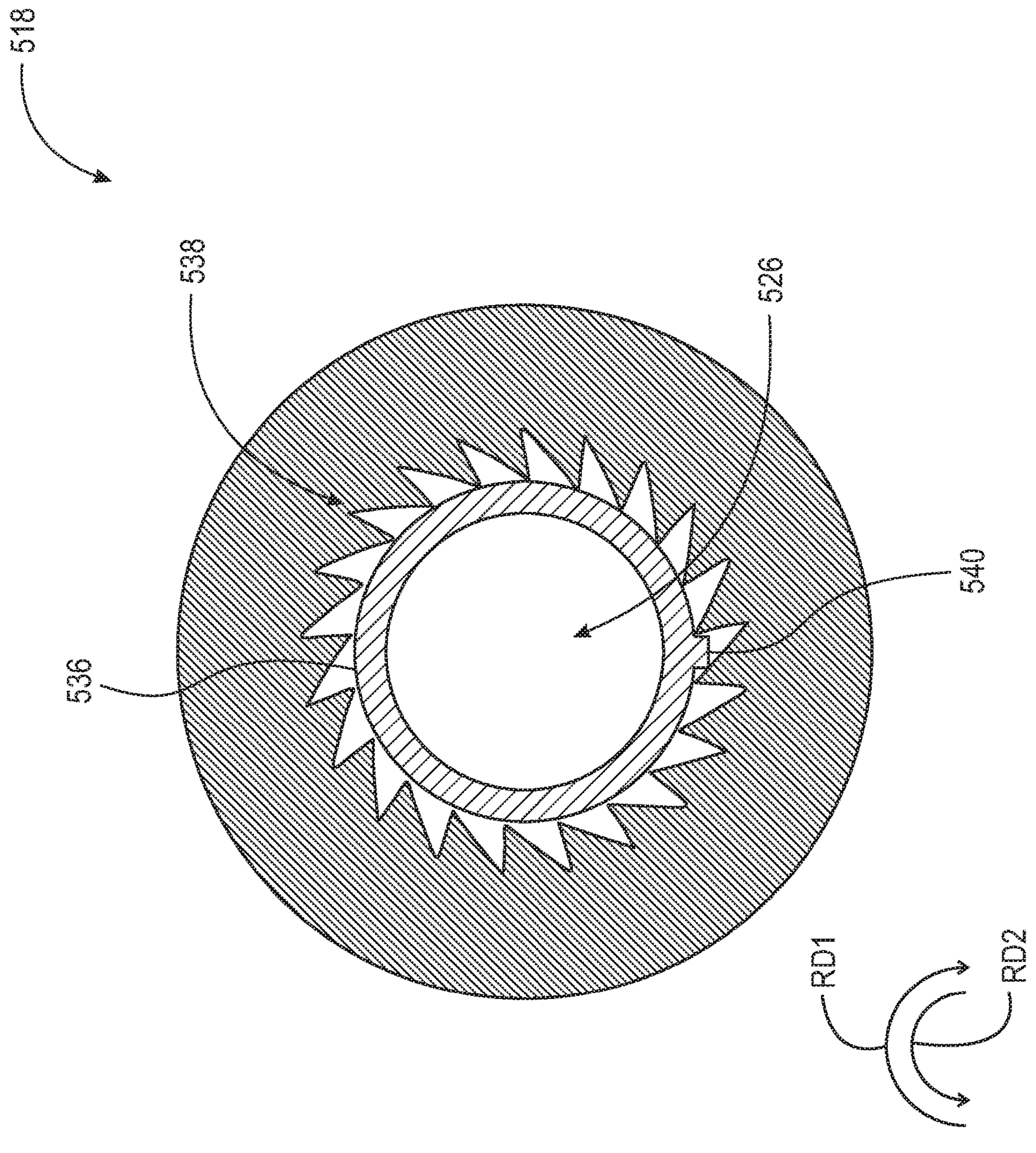
FIG. 15 is a cross-sectional view of a ratchet mechanism taken generally along line 15-15 in FIG. 14.

FIG. 15 is depicts a cross-sectional view of roller 518 taken generally along line 15-15 in FIG. 14. First tube 502 includes radial outwardly facing surface 536. Surface 536 includes stopping element 540 arranged to engage with plurality of teeth 538. Roller 518 includes plurality of teeth 538 arranged on a radially inwardly facing surface. Each tooth of plurality of teeth 538 are angled such that rotation of roller 518 in rotational direction RD1 causes each tooth to slide over and past stopping element 540 while preventing rotation of roller 518 in rotational direction RD2.

Thus it is seen that the objects of the invention are efficiently obtained, although changes and modifications to the invention should be readily apparent to those having ordinary skill in the art, which changes would not depart from the spirit and scope of the invention as claimed.

LIST OF REFERENCE NUMBERS

AD1 Axial direction
AD2 Axial direction
DR1 Direction
DR1 Direction
RD1 Rotational direction
RD2 Rotational direction
100 Roller device
102 First tube
104 First rod
106 Second rod
108 First handle

110 Second handle
112 First pressure clamp
114 Second pressure clamp
116 First roller
118 Second roller
120 Third roller
122 First end of first tube
124 Second end of first tube
126 Through-bore
128 First end of first rod
130 Second end of first rod
132 First end of second rod
134 Second end of second rod
136 Left bracket
138 Pin
140 Guard
141 Back plate
142 Support
144 Right bracket
146 Pin
148 Guard
149 Back plate
150 Support
152 Rack-Roller assembly
154 Rack
156 First plurality of through-bores
158 Second plurality of through-bores
200 Roller device
202 First tube
204 First rod
206 Second rod
208 First connector
210 Second connector
212 First pressure clamp
214 Second pressure clamp
216 First roller
218 Second roller
220 Third roller
222 First end of first tube
224 Second end of first tube
226 Through-bore
228 First end of first rod
230 Second end of first rod
232 First end of second rod
234 Second end of second rod
236 Left bracket
238 Pin
240 Guard
241 Back plate
242 Support
244 Right bracket
246 Pin
248 Guard
249 Back plate
250 Support
252 Rack-Roller assembly
254 Rack
256 First plurality of through-bores
258 Second plurality of through-bores
300 Roller device
302 First tube
304 First rod
306 Second rod
308 First fork
310 Second fork
312 First pressure clamp
314 Second pressure clamp
316 First roller
318 Second roller
320 Third roller
322 First end of first tube
324 Second end of first tube
326 Through-bore
328 First end of first rod
330 Second end of first rod
332 First end of second rod
334 Second end of second rod
336 Joint
338 Plate
339 Guard
340 Pin
341 Fork
342 Cross
344 Joint
346 Plate
347 Guard
348 Pin
349 Fork
350 Cross
352 Rack-Roller assembly
354 Rack
356 First plurality of through-bores
358 Second plurality of through-bores
400 Roller device
402 Door anchor
404 Carabiner
406 First strap
408 Second strap
410 First end
412 Second end
414 Anchor-roller assembly
416 Wall
418 Door
420 Door handle
422 Handle
424 Connector
500 Roller device
502 First tube
504 First rod
506 Second rod
508 First handle
510 Second handle
512 First pressure clamp
514 Second pressure clamp
516 First roller
518 Second roller
520 Third roller
522 First end of first tube
524 Second end of first tube
526 Through-bore
528 First end of first rod
530 Second end of first rod
532 First end of second rod
534 Second end of second rod
536 Surface
538 Plurality of teeth
540 Stopping element

What is claimed is:

1. A roller device, comprising:

a first tube having a first diameter, and a through-bore having a second diameter smaller than the first diameter, the through-bore extending through and concentric with the first tube;

a first rod having a third diameter smaller than the second diameter, a first end, and a second end, where the second end of the first rod is operatively arranged to adjustably detachably secure to and telescopingly engage with the through-bore of the first tube;

a second rod having a fourth diameter equal to the third diameter, a first end and a second end, where the first end of the second rod is operatively arranged to adjustably detachably secure to and telescopingly engage with the through-bore of the first tube;

at least one roller arranged to rotate about the first tube; and, a first handle secured to the first end of the first rod, wherein the roller device further comprises a first pressure clamp that asserts a force about a circumference of the first tube and the first rod so as to prevent the first rod from movement in a first or second direction relative to the first tube.

2. The roller device of claim 1 further comprising a first connector secured to the second end of the second rod and operatively arranged to engage with a first support structure.

3. The roller device of claim 1 further comprising a first connector secured to the second end of the second rod and operatively arranged to engage with a bracket on a first support structure.

4. The roller device of claim 1 further comprising a first connector secured to the second end of the second rod and operatively arranged to engage with a first anchor secured to a first support structure.

5. The roller device of claim 1 further comprising a second handle secured to the second end of the second rod and operatively arranged to provide a first force to the roller device.

6. The roller device of claim 1 further comprising a second pressure clamp that asserts a force about a circumference of the first tube and the second rod so as to prevent the second rod from movement in a first or second direction relative to the first tube.

7. The roller device of claim 1 wherein the at least one roller has a radially-outwardly facing surface and a radially-inwardly facing surface, where the radially-inwardly facing surface has a plurality of teeth.

8. The roller device of claim 1 further comprising a first fork secured to the second end of the second rod and operatively arranged to engage with a first joint.

9. A roller device, comprising:

a first tube having a first diameter, and a through-bore having a second diameter smaller than the first diameter, the through-bore extending through and concentric with the first tube;

a first rod having a third diameter smaller than the second diameter, a first end, and a second end, where the second end of the first rod is operatively arranged to adjustably detachably secure to and telescopingly engage with the through-bore of the first tube;

a second rod having a fourth diameter equal to the third diameter, a first end and a second end, where the first end of the second rod is operatively arranged to adjustably detachably secure to and telescopingly engage with the through-bore of the first tube;

at least one roller arranged to rotate about the first tube; and, a first connector secured to the first end of the first rod, wherein the roller device further comprises a first pressure clamp that asserts a force about a circumference of the first tube and the first rod so as to prevent the first rod from movement in a first or second direction relative to the first tube.

10. The roller device of claim 9 further comprising a second connector secured to the second end of the second rod and operatively arranged to engage with a first support structure.

11. The roller device of claim 10, wherein the first connector further comprises a first fork, and the second connector further comprises a second fork, wherein the first fork and the second fork are operatively arranged to engage with a first joint and a second joint, respectively.

12. The roller device of claim 10 wherein the first connector and the second connector are operatively arranged to engage with a first bracket and a second bracket, respectively, where the first and second brackets are secured to a first support structure.

13. The roller device of claim 9 further comprising a second pressure clamp that asserts a force about a circumference of the first tube and the second rod so as to prevent the second rod from movement in a first or second direction relative to the first tube.

14. The roller device of claim 9 wherein the at least one roller has a radially-outwardly facing surface and a radially-inwardly facing surface, where the radially-inwardly facing surface has a plurality of teeth.

15. A physical fitness cage/roller device assembly comprising:

a physical fitness cage having a first vertical support and a second vertical support; and, a roller device comprising:

a first tube having a first diameter, and a through-bore having a second diameter smaller than the first diameter, the through-bore extending through and concentric with the first tube;

a first rod having a third diameter smaller than the second diameter, a first end, and a second end, where the second end of the first rod is operatively arranged to adjustably detachably secure to and telescopingly engage with the through-bore of the first tube;

a second rod having a fourth diameter equal to the third diameter, a first end and a second end, where the first end of the second rod is operatively arranged to adjustably detachably secure to and telescopingly engage with the through-bore of the first tube; and, at least one roller arranged to rotate about the first tube, wherein the roller device further comprises a first pressure clamp that asserts a force about a circumference of the first tube and the first rod so as to prevent the first rod from movement in a first or second direction relative to the first tube, and a second pressure clamp that asserts a force about a circumference of the first tube and the second rod so as to prevent the second rod from movement in a first or second direction relative to the first tube.

16. The physical fitness cage/roller device assembly of claim 15 wherein the roller device further comprises a first handle secured to the first end of the first rod, and a second handle secured to the second end of the second rod.

17. The physical fitness cage/roller device assembly of claim 16 further comprising:

a first bracket operatively arranged to engage the first vertical support of the physical fitness cage, the first bracket further arranged to receive and support the first handle; and, a second bracket operatively arranged to engage the second vertical support of the physical fitness cage, the second bracket further arranged to receive and support the second handle.

18. The physical fitness cage/roller device assembly of claim 15 wherein the roller device further comprises a connector secured to the first end of the first rod, and a second connector secured to the second end of the second rod.

19. The physical fitness cage/roller device assembly of claim 18 further comprising:

a first bracket operatively arranged to engage the first vertical support of the physical fitness cage, the first bracket further arranged to receive and support the first connector; and, a second bracket operatively arranged to engage the second vertical support of the physical fitness cage, the second bracket further arranged to receive and support the second connector.

* * * * *